(12) United States Patent
Rodels

(10) Patent No.: US 7,874,095 B2
(45) Date of Patent: Jan. 25, 2011

(54) FISHING LURE

(76) Inventor: Leonid Rodels, 1403 - 101160 115 Street, Edmonton, AB (CA) T5K 1T6

( * ) Notice: Subject to any disclaimer, the term of this patent is extended or adjusted under 35 U.S.C. 154(b) by 0 days.

(21) Appl. No.: 11/756,569

(22) Filed: May 31, 2007

(65) Prior Publication Data

US 2007/0289198 A1 Dec. 20, 2007

(30) Foreign Application Priority Data

Jun. 20, 2006 (CA) .................................. 2555073

(51) Int. Cl.
*A01K 85/00* (2006.01)
*A01K 85/02* (2006.01)
(52) U.S. Cl. ..................... 43/42.36; 43/42.05
(58) Field of Classification Search ............... 43/42.05, 43/42.36, 42.37, 42.41, 42.49
See application file for complete search history.

(56) References Cited

U.S. PATENT DOCUMENTS

| | | | | |
|---|---|---|---|---|
| 1,694,697 A | * | 12/1928 | Beidatsch | 43/35 |
| 2,570,100 A | * | 10/1951 | Collins | 43/42.09 |
| 2,871,609 A | * | 2/1959 | Noches | 43/42.06 |
| 3,665,634 A | * | 5/1972 | Baud | 43/35 |
| 4,139,963 A | * | 2/1979 | Ingram | 43/42.03 |
| 4,414,772 A | * | 11/1983 | Duncan | 43/42.36 |
| 4,447,981 A | * | 5/1984 | Bauer | 43/42.21 |
| 4,796,375 A | * | 1/1989 | Wilson | 43/42.05 |
| 5,090,151 A | * | 2/1992 | Salminen | 43/42.05 |
| 5,367,817 A | * | 11/1994 | Clark | 43/42.36 |
| 5,537,775 A | * | 7/1996 | Crumrine | 43/42.38 |
| 6,546,663 B1 | * | 4/2003 | Signitzer et al. | 43/4.5 |
| 6,772,552 B2 | * | 8/2004 | Parrish | 43/35 |

FOREIGN PATENT DOCUMENTS

DE 10310803 9/2004

* cited by examiner

*Primary Examiner*—David J Parsley
(74) *Attorney, Agent, or Firm*—Christensen O'Connor Johnson Kindness PLLC

(57) ABSTRACT

A fishing lure has a body having a front end, a rear end, a top and a bottom. A hook is secured by a shank to the rear end of the body. A slot extends through the body from the top to the bottom. The slot at the top of the body is enlarged toward the front end and the slot at the bottom of the body is enlarged toward the rear end. A fishing line, is extended through the slot from the top to the bottom and secured to the shank of the hook. The body assumes a substantially linear orientation when the body is pulled forward by the line, such as when casting or trolling. The body enlarged slot results in the body pitching, such as to imitate a swimming motion during jigging.

4 Claims, 2 Drawing Sheets

FISHING LURE

FIELD

The present application relates to a fishing lure.

BACKGROUND

A Russian fishing lure used for jigging known as a "marmooshka" is constructed with a narrow slot extending through the body of the lure from top to bottom. Instead of a fishing line being attached to a front of the body, the fishing line is extended through the slot and attached to a shank of a rear mounted hook.

SUMMARY

There is provided a fishing lure which includes a body having a front end, a rear end, a top and a bottom. A hook is secured by a shank to the rear end of the body. A slot extends through the body from the top to the bottom. The slot at the top of the body is enlarged toward the front end and the slot at the bottom of the body is enlarged toward the rear end, such that a fishing line, extended through the slot from the top to the bottom and secured to the shank of the hook, will assume a substantially linear orientation when the body is pulled forward by the line, such as when casting or trolling. The body is balanced so that it is adapted to always return to substantially horizontal position when suspended from a substantially vertical line. The enlarged top of the slot resulting in the body pitching, such as to imitate a swimming motion during jigging

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 3:
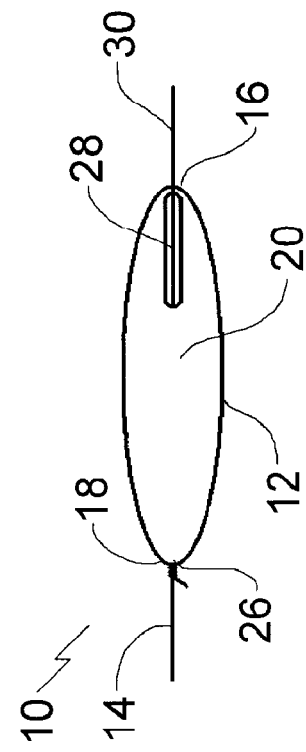
FIG. 3 is a top plan view of the fishing lure of FIG. 1.

A fishing lure generally identified by reference numeral 10, will now be described with reference to FIG. 1 through 5.

Figure 4:
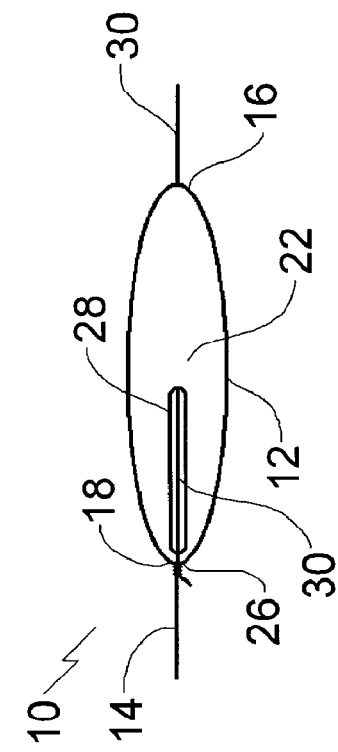
FIG. 4 is a bottom plan view of the fishing lure of FIG. 1.
Figure 1:
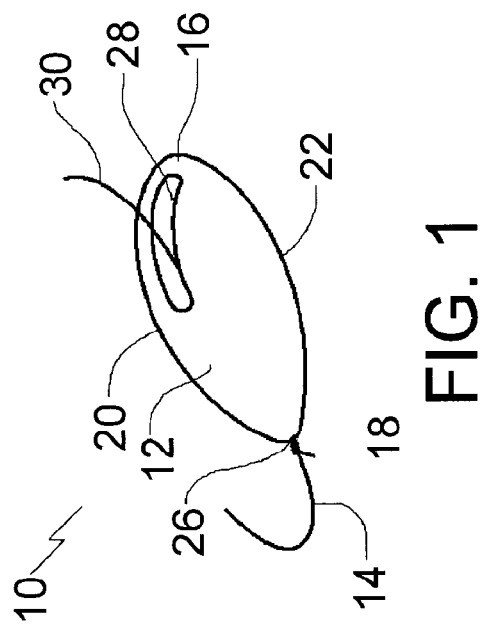
FIG. 1 is a perspective view of the fishing lure.
Figure 2:
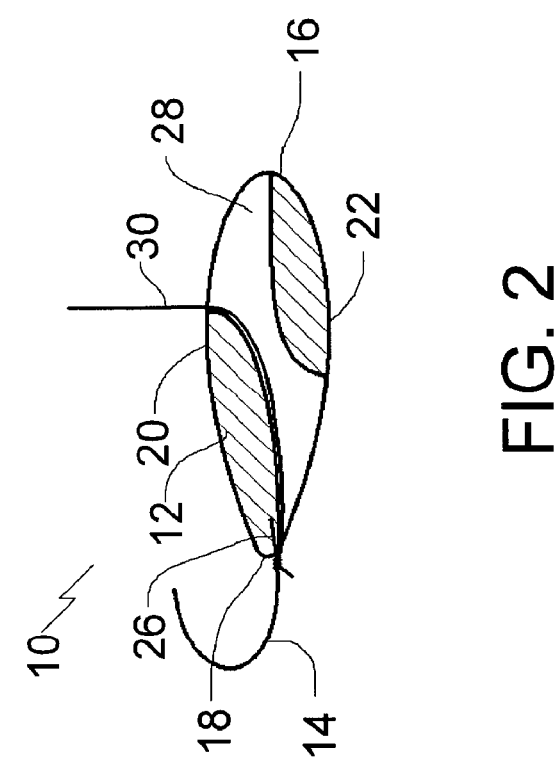
FIG. 2 is a side elevation view in section of the fishing lure of FIG. 1, suspended from a vertical fishing line.

Structure and Relationship of Parts:

Referring to FIG. 1, fishing lure 10 includes a body 12 and a hook 14. Body 12 has a front end 16, a rear end 18, a top 20 and a bottom 22. Referring to FIG. 2, hook 14 is secured by a shank 26 to rear end 18 of body 12. There is also a slot 28 extending through body 12 from top 20 to bottom 22. Referring to FIGS. 3 and 4, at top 20 of body 12, slot 28 is enlarged toward front end 16, whereas at bottom 22 of body 12, slot 28 is enlarged toward rear end 18. Referring again to FIG. 2, a fishing line 30 that extends through slot 28 from top 20 to bottom 22 and is secured to shank 26 of hook 14.

Figure 5:
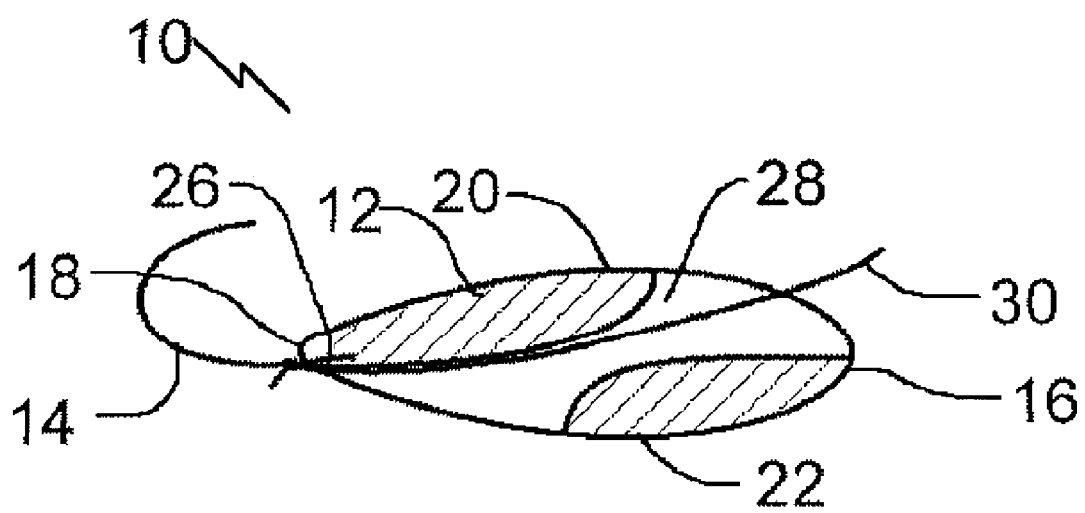
FIG. 5 is a side elevation view in section of the fishing lure of FIG. 1, pulled by a fishing line casting or trolling.

Operation:

The operation of fishing lure 10 will now be described with reference to FIG. 1 through 5. The objective is to imitate the motion of living things when moving through the water. Referring to FIG. 5, there is illustrated how enlarged top 20 of slot 28 enables body 12 to assume a substantially linear orientation when body 12 is pulled forward by line 30, such as when casting or trolling. Referring to FIG. 2, there is illustrated body 12 suspended from a substantially vertical fishing line 30. It will be understood how enlarged top 20 of slot 28 results in body 12 pitching, dramatically in response to jigging or more subtly in response to vibrations imparted by the fisherman.

When casting an upward and forward force exerted by fishing line 30, will result in body 12 moving upwardly, front first, resembling the movement of a minnow. When force is released, body 12 will dive, front first, again resembling the movement of a minnow.

All movements are exaggerated when the fisherman places bait on his hook or something substituting for bait, if the lure has artificial or imitation bait used on a "baitless" lure. Bait that is lighter in density that the density of body 12, will result in a "parachute effect" that will effect the movement of body 12 in water.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope defined in the Claims.

What is claimed is:

1. A fishing lure, comprising:
a body having a front end, a rear end, a top, and a bottom;
a hook having a shank embedded in the rear end of the body; and
a slot extending through the body from the top at the front end to the bottom at the rear end, the slot extending between a first remaining portion of the body at the bottom and front end and a second remaining portion of the body at the top and rear end,
wherein at the front end of the body the slot extends from the top partway through the body toward the bottom and from a position defining a balance position for the body intermediate the front end and the rear end to the front end, and at the rear end of the body the slot extends from the bottom partway through the body toward the top and from a position intermediate the front end and the rear end to the rear end;
wherein the first remaining portion extends from a position intermediate the front end and the rear end to the front end at a midline of the body substantially in axial alignment with the shank and from the midline of the body to the bottom, the first remaining portion tapering with a convex curve from the bottom of the body toward the front at the midline of the body; and
wherein the second remaining portion extends from a position intermediate the front end and the rear end to the rear end and from the midline of the body to the top, the second remaining portion tapering with a convex curve from the top of the body toward the rear at the midline of the body.

2. A fishing lure, comprising:
a body having a front end, a rear end, a top, and a bottom;
a hook having a shank embedded in the rear end of the body;
a slot extending through the body from the top at the front end to the bottom at the rear end, the slot at the front end of the body extending from the top partway through the body toward the bottom and from a position defining a balance position for the body intermediate the front end and the rear end to the front end with a first remaining portion at the bottom of the body at the front end extending from a position intermediate the front end and the rear end to the front end, wherein the slot tapers inward from the front end and top of the body down to a middle portion of the body; and the slot at the rear end of the body extending from the bottom partway through the body toward the top and from a position intermediate the front end and the rear end to the rear end with a second remaining portion at the top of the body at the rear end extending from a position intermediate the front end and the rear end to the rear end, wherein the slot tapers outward from the middle portion of the body to the rear end and bottom of the body; and a fishing line extending through the slot from the top to the bottom and secured to the shank of the hook, the fishing line being positioned in a linear orientation in axial alignment with the shank when trolling, and the fishing line being positioned in a vertical orientation and supporting the body in a balanced position when jigging.

3. A fishing lure, comprising:

a hollow body having a front end, a rear end, a top, and a bottom;

a hook having a shank embedded in the rear end of the body; and a slot extending at an angle through the body from the top at the front end to the bottom at the rear end, wherein the slot extends through the body between a lower interior body portion positioned at a bottom front end of the body and an upper interior body portion positioned at an upper rear end of the body, the lower interior body portion having a depth from the bottom of the body to a position intermediate the top and the bottom and a length from the front end of the body to a position intermediate the front end and the rear end, and the upper interior body portion having a depth from the top of the body to a position proximate to the shank of the hook and a length from the rear end of the body to a convex curve terminus at a balance position intermediate the front end and the rear end, wherein the slot narrows from the front and top of the body to a medial portion of the body and then widens from the medial portion of the body to the rear and bottom of the body, the medial portion of the body being positioned intermediate the front and rear end and the top and bottom of the body.

4. The fishing lure of claim 3, wherein the medial portion is positioned at the balance position of the body.

* * * * *

UNITED STATES PATENT AND TRADEMARK OFFICE
CERTIFICATE OF CORRECTION

| | | |
|---|---|---|
| PATENT NO. | : 7,874,095 B2 | Page 1 of 1 |
| APPLICATION NO. | : 11/756569 | |
| DATED | : January 25, 2011 | |
| INVENTOR(S) | : L. Rodels | |

It is certified that error appears in the above-identified patent and that said Letters Patent is hereby corrected as shown below:

On the Title Pg.

Item (30)  Foreign Appln. Priority Data  "2555073" should read --2550733--

Signed and Sealed this

Thirty-first Day of January, 2012

David J. Kappos
*Director of the United States Patent and Trademark Office*